United States Patent
Tomoda

[11] Patent Number: 5,882,748
[45] Date of Patent: Mar. 16, 1999

[54] DISC STORAGE BAG

[75] Inventor: Hideyuki Tomoda, Osaka, Japan

[73] Assignee: Tomoda Giken Industry Co., Ltd., Osaka, Japan

[21] Appl. No.: 806,284

[22] Filed: Feb. 25, 1997

[30] Foreign Application Priority Data

Oct. 21, 1996 [JP] Japan ..................................... 8-276737
Oct. 21, 1996 [JP] Japan ..................................... 8-276738

[51] Int. Cl.⁶ ............................ B65D 85/57; B29D 22/00
[52] U.S. Cl. ....................... 428/35.2; 428/35.7; 428/36.1; 206/308.1; 206/309; 206/311; 206/312
[58] Field of Search ................................. 428/34.1, 35.2, 428/35.7, 36.1; 206/308.1, 309, 311, 312, 313, 8, 82, 83; D19/33; D3/227, 253

[56] References Cited

U.S. PATENT DOCUMENTS

| | | | |
|---|---|---|---|
| 3,876,134 | 4/1975 | Rice et. al. | 229/68 |
| 4,355,718 | 10/1982 | Hagelberg | 206/312 |
| 4,637,945 | 1/1987 | Masui et al. | 428/35.2 |
| 4,971,195 | 11/1990 | Mitsuyama | 206/311 |
| 5,462,160 | 10/1995 | Youngs | 206/312 |
| 5,531,320 | 7/1996 | Uchida | 206/308.1 |
| 5,588,528 | 12/1996 | Ozeki | 206/308.1 |

FOREIGN PATENT DOCUMENTS

| | | |
|---|---|---|
| 29512442 | 10/1995 | Germany . |
| 29608174 | 8/1996 | Germany . |
| 676699 | 2/1991 | Switzerland . |

Primary Examiner—Ellis Robinson
Assistant Examiner—Jennifer M. Hayes
Attorney, Agent, or Firm—Fildes & Outland, P.C.

[57] ABSTRACT

The present invention has an object to provide a disc storage bag being able to prevent a disc stored therein from falling off from the bag. The disc storage bag of the invention comprises a first sheet made of a nonwoven fabric, a second sheet disposed at least on one surface of the first sheet for covering part of the surface on one end side of the first sheet, and a third sheet for covering part of the same surface of the first sheet on the other end side thereof, whereby the first sheet forms a disc storage portion jointly with the second and third sheets. The first and second sheets are closed at the one end and opposite lateral sides for forming a bag portion therebetween. The third sheet is connected to the first sheet at the other end side and further bonded by heat-sealing to the first sheet at a pair of suitable portions positioned at the opposite lateral sides on the other end side or somewhat inward from the lateral sides, said portions also being positioned somewhat distant from the connected portion of the first and third sheets on the other end side toward the one end side of the first sheet.

13 Claims, 14 Drawing Sheets

DISC STORAGE BAG

TECHNICAL FIELD

The present invention relates to a disc storage bag for storing therein a disc such as a CD (compact disc).

BACKGROUND ART

A known conventional disc storage bag for storing therein a disc such as a CD comprises a sheet made of a nonwoven fabric forming the back side of the bag and a sheet made of a synthetic resin film of polypropylene forming the front side of the bag, in which the two sheets are bonded together by way of heat sealing at lateral sides and lower end side thereof so as to form an opening at the upper end thereof for insertion/removal of a disc in/from the bag.

The conventional disc storage bag has posed a problem that a disc may accidentally fall out of the bag when the bag is inclined or turned upside down, because the upper end of the bag is left open.

Another problem is that, because the upper end is open, the conventional disc storage bag easily permits dust to enter and to adhere to a disc held therein.

Still another problem arises when a disc is taken out of the bag. To take out a disc from the storage bag, about a half of the disc needs be slipped out of the bag so that the disc may be held by two fingers, one inserted in a central hole of the disc and the other holding to the periphery of the disc, whereby the disc being thus held can be taken out of the bag. In this case, similarly to the aforementioned problem, the disc may accidentally fall out of the storage bag when the disc is tried to be half slipped out of the storage bag.

DISCLOSURE OF THE INVENTION

In view of the foregoing, it is an object of the present invention to provide a disc storage bag which eliminates the problem that the disc may fall out of the disc storage bag when the bag is inclined or turned upside down. It is another object of the invention to prevent dust from adhering to a disc held in the disc storage bag.

The invention for achieving the above objects may be summarized as follows.

(1) A disc storage bag comprises: a first sheet formed of a nonwoven fabric; a second sheet overlaid at least on one surface of the first sheet for covering part of the surface of the first sheet on one end side of the first sheet; and a third sheet overlaid on the surface of the first sheet for covering part of the first sheet on the other end side thereof; the first sheet forming a disc storage portion jointly with the second and third sheets; the first and second sheets being closed at the one end and opposite lateral sides thereof so as to form a bag-like structure therebetween; the third sheet being connected to the first sheet at the other end side and further bonded by heat-sealing to the first sheet at a pair of suitable portions at opposite lateral sides on the other end side or somewhat inward from said lateral sides, and somewhat distant toward the one end side of the first sheet from the connected portion of the first and third sheets on the other end side; said third sheet including a free portion not bonded to the first sheet, which extends from the pair of bonded positions toward the one end side of the first sheet; wherein the pair of bonded portions are so located that a line virtually extending between respective tips thereof intersects a disc near its the-other-end-side periphery but somewhat distant therefrom toward the one end side of the first sheet when the disc is held in the disc storage bag.

(2) The aforesaid disc storage bage further comprises a plurality of disc storage portions in juxtaposition, characterized in that adjacent disc storage portions have respective third sheets which are separated from each other such that each third sheet may be openable independently.

According to the structure as described in (1), the third sheet is bonded by heat-sealing to the first sheet at the pair of suitable positions at opposite lateral sides on the other end side of the first sheet or somewhat inward from said opposite lateral sides, said heat-seal portions being somewhat distant from the connected portion of the first and third sheets on the other end side toward the one end side of the first sheet so that a line virtually extending between the bonded portions intersects a disc held in the storage bag, said intersecting line being somewhat distant toward the one end side from the peripheral end of the disc nearest to the connected portion of the first and third sheets, thereby defining a bag-like structure between the pair of bonded portions. Accordingly, even when the disc storage bag holding a disc therein is put in a position that other end side thereof turned downward, causing the third sheet to open because of the weight of the disc, this structure prevents the third sheet from opening due to the weight of the disc, thus avoiding the fall of the disc from the storage bag. Further, when the disc storage bag holding a disc therein is in an upright position with the other end side thereof turned upward, the third sheet closes the upper end of the storage bag, thereby preventing dust from adhering to the disc in the disc storage portion.

According to the structure described in (2), the third sheets of adjacent disc storage portions are separated from each other. This structure allows each disc storage portion to be independently opened/closed for insertion/removal of a disc, thus enhancing the convenience during use.

DESCRIPTION OF EMBODIMENTS

Figure 1:
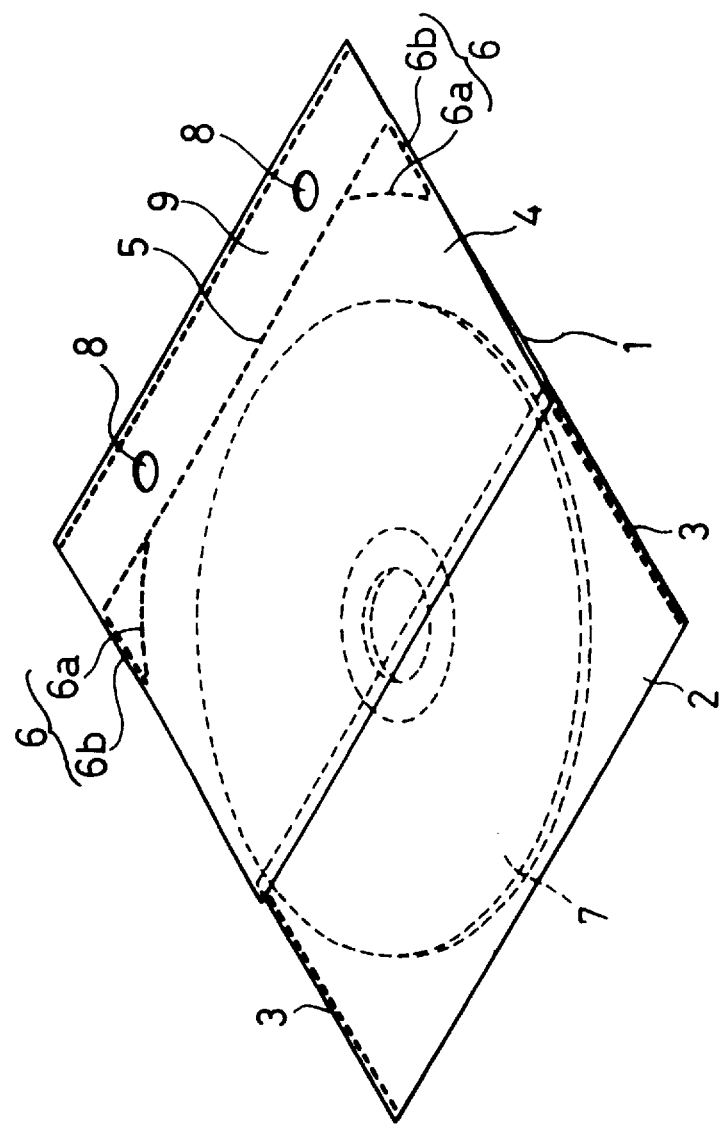
FIG. 1 is a perspective view illustrating a front surface side of a disc storage bag according to a first embodiment of the invention.
Figure 2:
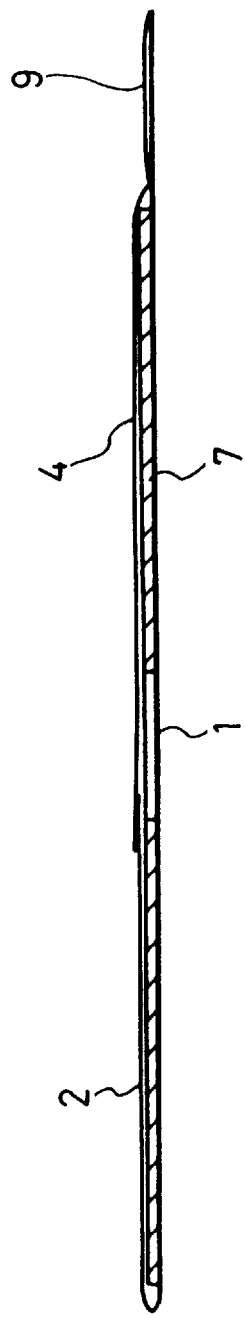
FIG. 2 is a sectional view of the disc storage bag.
Figure 3:
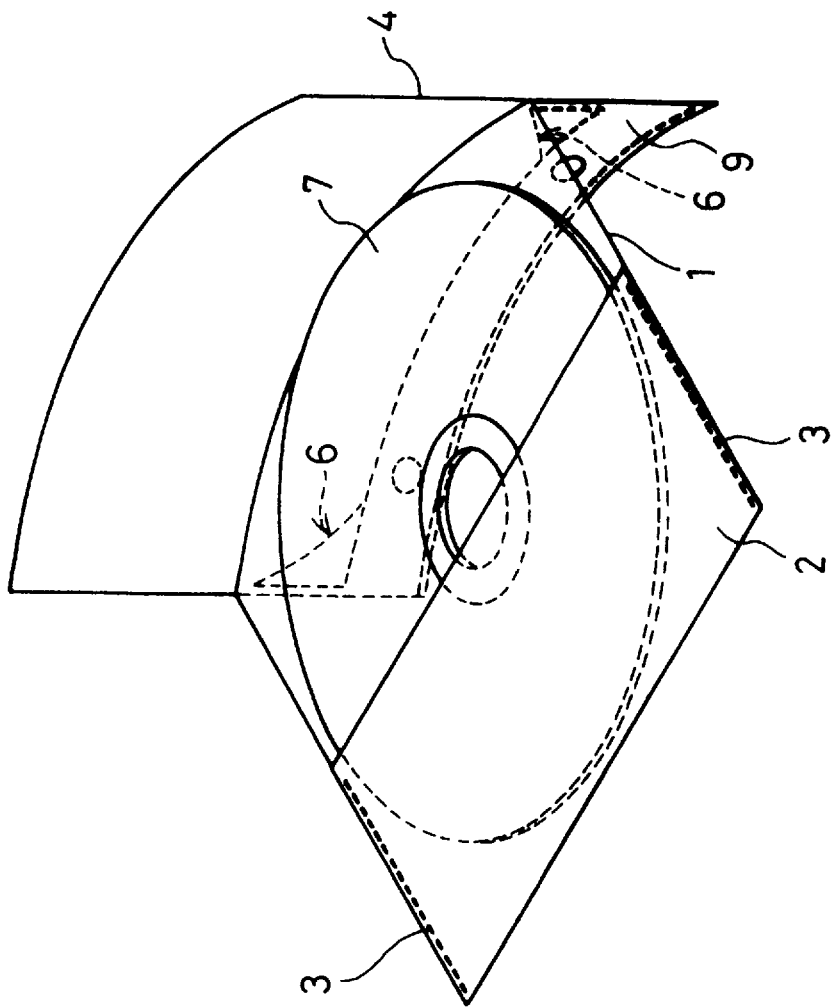
FIG. 3 is a perspective view illustrating a state wherein a disc is being inserted in the disc storage bag.

FIGS. 1 through 3 illustrate a first embodiment of the invention. In FIGS. 1 through 3, a first sheet indicated by 1 has a substantially square shape and is formed of a nonwoven fabric. A second sheet indicated by 2 is overlaid on the first sheet 1 for covering substantially a half of the surface area of the first sheet 1 on one end side thereof. The second sheet 2 is formed of a nonwoven fabric continuous to and bent along the one end side of the first sheet 1. The second sheet 2 is bonded by heat-sealing to the first sheet 1 on both lateral sides thereof, whereby the second and first sheets are closed on the one end and lateral sides thereof to form a bag-like structure. Indicated by 3 are heat-seal portions at which the second and first sheets 2 and 1 are bonded together by heat-sealing. A third sheet indicated by 4 is formed of a transparent or semitransparent synthetic resin film substantially covering the other half of the surface area of the first sheet 1 on the other end side. The third sheet 4 is bonded by heat-sealing to the first sheet 1 for the entire length of the other end side as well as at corner portions at opposite sides on the other end side. Indicated by 5 is a heat-sealed line along which the third sheet 4 is bonded to the first sheet 1 on the other end side. The third sheet 4 is also bonded to the first sheet 1 at a pair of heat-seal portions indicated by 6, or corner portions at opposite lateral sides of the first sheet 1 on the other end side. Each of the heat-seal portions 6 includes an oblique line 6a obliqued outwardly substantially at 45° with respect to the heat-sealed line 5 on the other end side of the first sheet 1 and a vertical line 6b interconnecting the outward end of the oblique line 6a and the heat-sealed line 5. The third sheet 4 includes a free portion which is not bonded to the first sheet 1, said free portion extending from the pair of heat-seal portions 6 toward the one end side of the first sheet. The end border of the third sheet 4 overlaps the second sheet 2. A disc 7 is accommodated in a disc storage bag as inserted in a bag-like structure jointly formed by the first and second sheets 1 and 2 and as covered by the third sheet 4. The two heat-seal portions 6 are located such that a virtual line extending between the tips of the heat-seal portions 6 respectively formed of the oblique line 6a and the vertical line 6b intersects a disc held in the disc storage bag across the other-end-side part thereof. Indicated by 8 are filing holes perforated outside of the heat-sealed line 5 in an extended laminate portion 9 of the first and third sheets 1 and 4. The filing holes 8 may be formed as required. Usable materials for the respective sheets 1, 2 and 4 are polypropylene, polyethylene or the like. It is particularly preferred to form the first and second sheets 1 and 2 with a nonwoven long fiber fabric such as of polypropylene, polyethylene or the like which produce no fluffs.

In a disc storage bag of the above structure, the second sheet 2 and the third sheet 4 are overlaid on one surface of the first sheet 1 for jointly forming a disc storage portion.

In accommodating a disc 7 in the disc storage portion, the third sheet 4 is first opened to insert the disc 7 between the first and second sheets 1 and 2, as illustrated in FIG. 3, and then the third sheet 4 is closed. In this case, the disc 7 is inserted in place with the recorded side facing the first sheet 1. When the disc storage bag holding the disc 7 is turned to be in a position that a connected portion of the first and third sheets 1 and 4 comes downward, the weight of the disc 7 is applied substantially to the central part of the heat-sealed line 5, and the third sheet 4 tends to open. However, the disc storage bag has such a structure that the third sheet 4 is bonded to the first sheet 1 at the pair of heat-seal portions 6 at opposite sides on the other end side of the first sheet 1, thereby forming a bag-like structure between the first and third sheets such that a line virtually extending between the tips of the heat-seal portions 6 intersects the disc held in the storage portion, said intersecting line being across the other-end-side part of the disc. Thus, the structure prevents the third sheet 4 from being opened by the weight of the disc 7, thereby avoiding the fall of the disc 7 from the storage bag.

In removing a disc 7 from the disc storage bag, the third sheet 4 is first opened in the same manner as in accommodating the disc in the bag. In this state, the disc is held between two fingers, one being inserted in the central hole of the disc 7 and the other holding the outer periphery of the disc 7, in order for pulling out the disk 7 from between the first and second sheets 1 and 2.

It should be noted that although the second sheet 2 is formed of a nonwoven fabric in the first embodiment, the second sheet 2 may be formed of a synthetic resin film similarly to the third sheet 4. Alternatively, all the first, second and third sheets 1, 2 and 4 may be formed of a nonwoven fabric.

Figure 4:
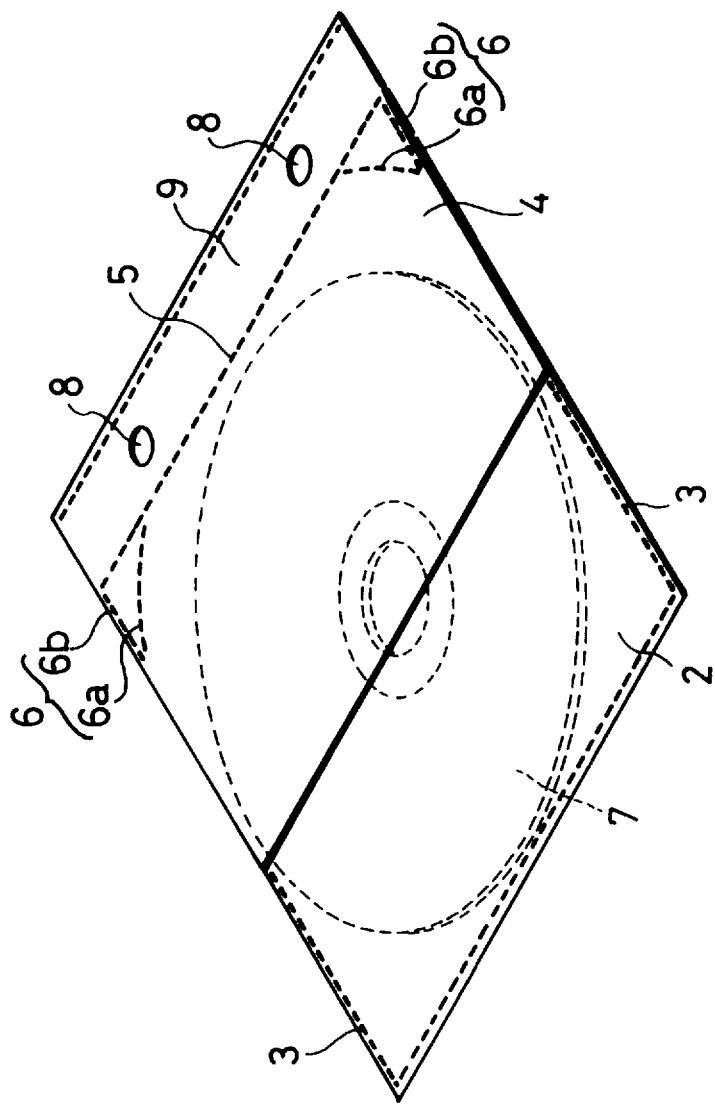
FIG. 4 is a perspective view illustrating a front surface side of a disc storage bag according to a second embodiment of the invention.
Figure 5:
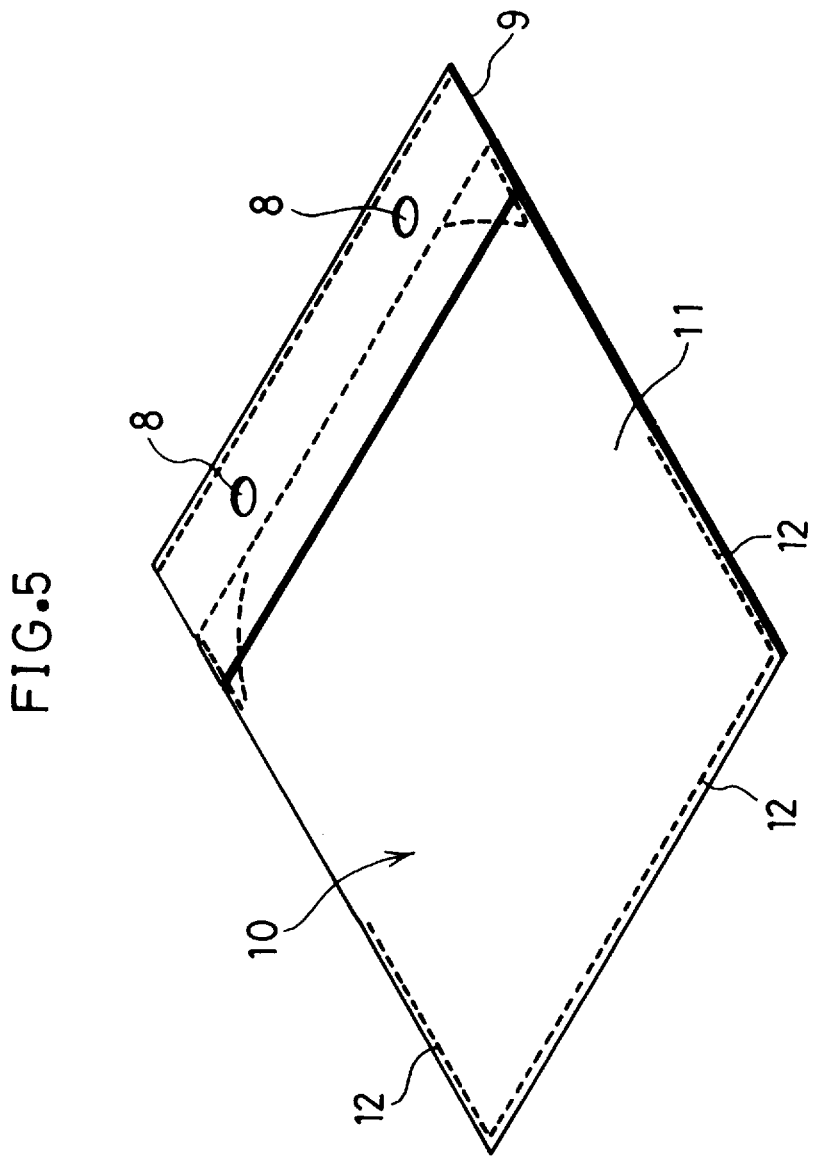
FIG. 5 is a perspective view illustrating a back surface of the disc storage bag according to the second embodiment of the invention.
Figure 6:
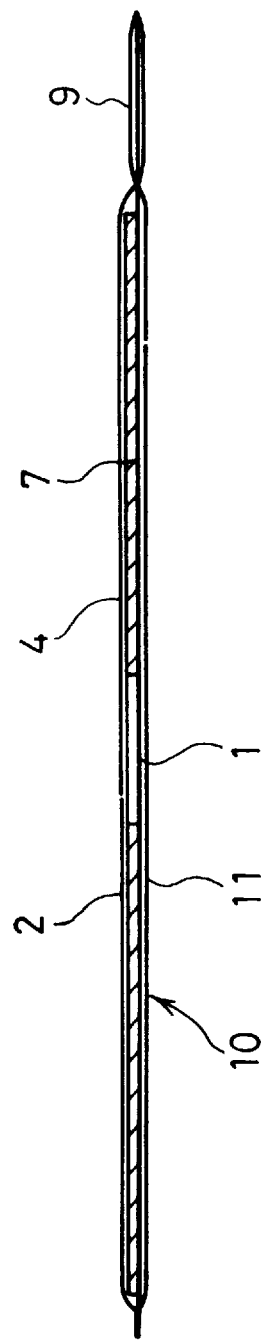
FIG. 6 is a sectional view of the disc storage bag.

Although the disc storage portion is formed on one surface of the first sheet 1 according to the first embodiment, a paper holding portion 10 for holding a songs card or the like may be formed on the other surface of the first sheet 1 as shown in FIGS. 4 through 6 illustrating a second embodiment. The paper holding portion 10 comprises a sheet portion 11 such as formed of a nonwoven fabric or a synthetic resin film, which is overlaid on the other surface of the first sheet 1 and bonded by heat-sealing to the first sheet 1 at the one end and lateral sides thereof. Indicated by 12 is another heat-sealed portion. The sheet 11 is of a slightly smaller size than the first sheet 1. The heat-sealed portion 12 extends along the one end side of the first sheet 1 and along the lateral sides from said one end side to substantially a midpoint on each lateral side, so that the other half of the sheet 11 on the other-end side is not bonded by heat-sealing to the first sheet 1. In the second embodiment, the end border of the third sheet 4 abuts against the end border of the second sheet 2.

Figure 7:
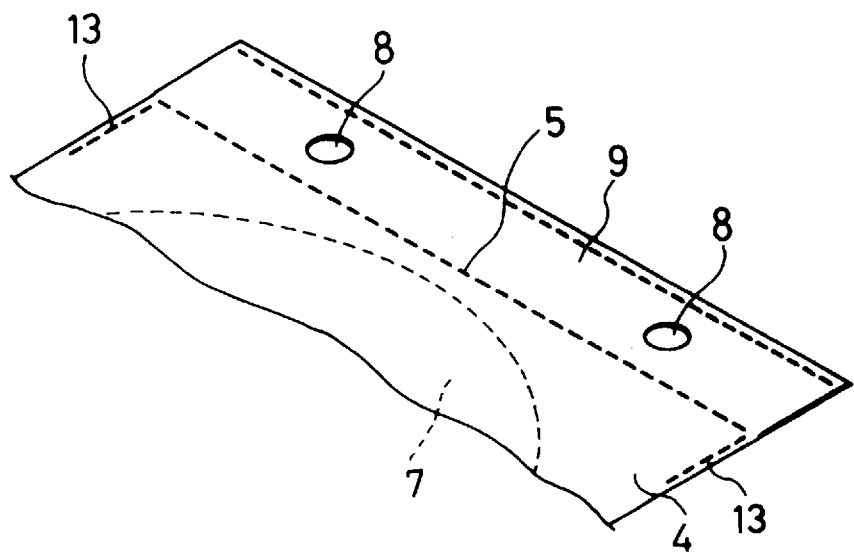
FIG. 7 is a perspective view illustrating a principal portion of a disc storage bag according to a third embodiment of the invention.
Figure 8:
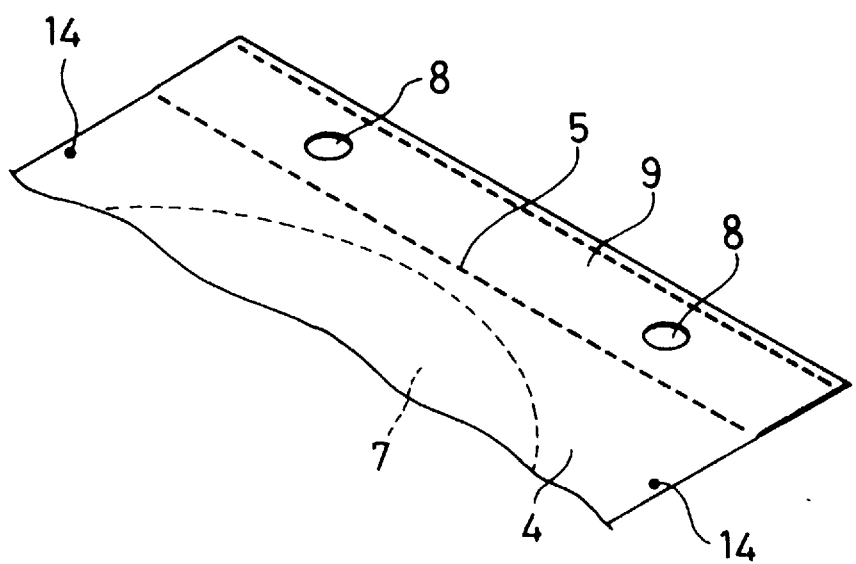
FIG. 8 is a perspective view illustrating a principal portion of a disc storage bag according to a fourth embodiment of the invention.
Figure 9:
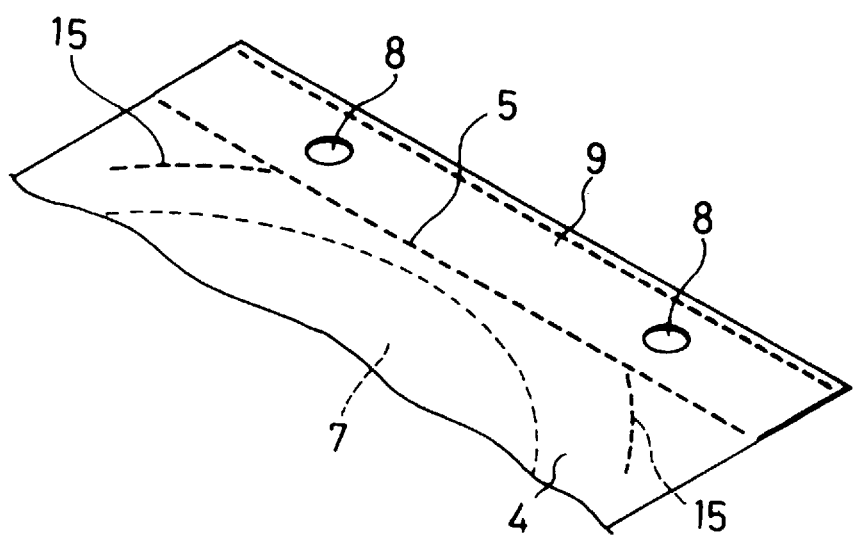
FIG. 9 is a perspective view illustrating a principal portion of a disc storage bag according to a fifth embodiment of the invention.
Figure 10:
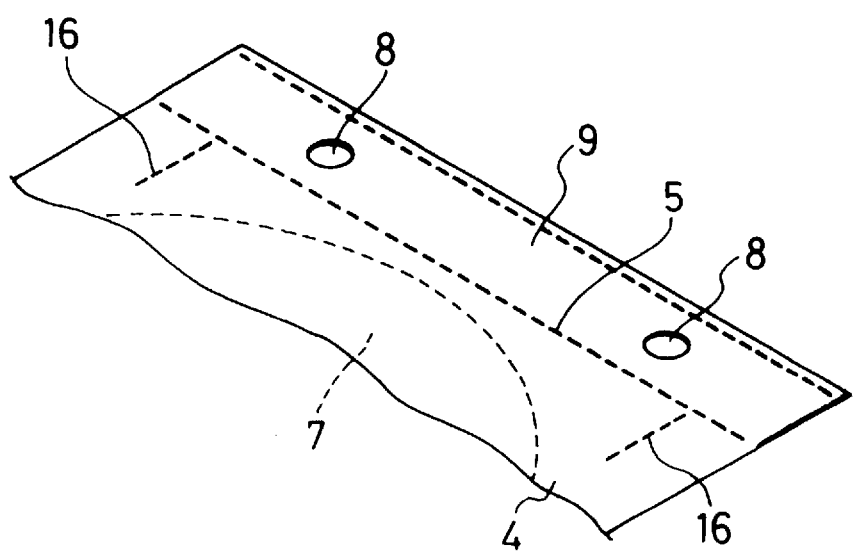
FIG. 10 is a perspective view illustrating a principal portion of a disc storage bag according to a sixth embodiment of the invention.
Figure 11:
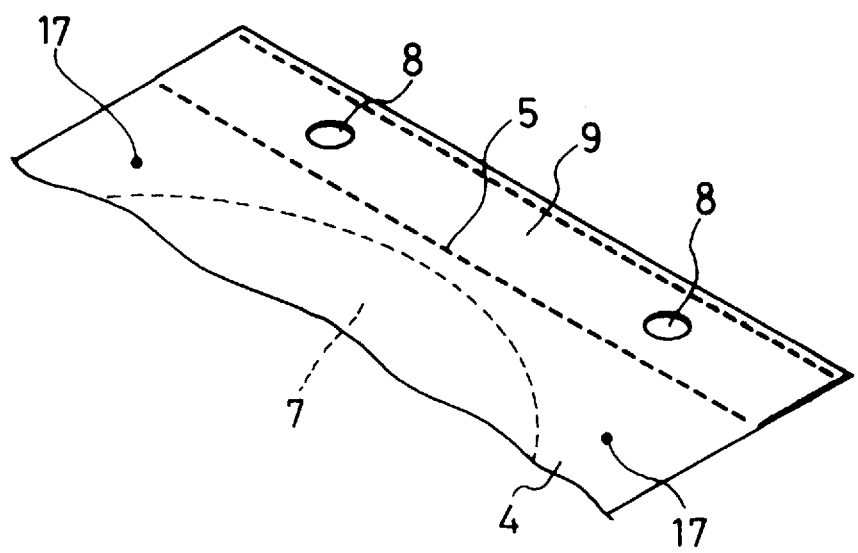
FIG. 11 is a perspective view illustrating a principal portion of a disc storage bag according to a seventh embodiment of the invention.

In the first embodiment, the third sheet 4 is bonded to the first sheet 1 at the heat-seal portions 6 at the opposite corners across the other-end side of the first sheet 1, each heat-seal portion 6 including the oblique line 6a obliqued outwardly substantially at 45° to the heat-sealed line 5 and the vertical line 6b interconnecting the end point of the oblique line 6a and the heat-sealed line 5. Alternatively, as shown in a third embodiment of FIG. 7, the third sheet 4 may be bonded to the first sheet 1 at rectilinear heat-seal portions 13 extending from respective ends of the heat-sealed line 5 on the other end side of the first sheet 1. Further, as shown in a fourth embodiment of FIG. 8, the third sheet 4 may be bonded to the first sheet 1 at spot-like heat-seal portions 14 at opposite lateral sides and vertically away from the heat-sealed line 5 toward the one-end side of the first sheet 1. Alternatively, the heat-seal portions may be somewhat inward from the opposite lateral sides. For example, the third sheet 4 may be bonded to the first sheet 1 at linear heat-seal portions 15 obliqued outwardly substantially at 45° to the heat-sealed line 5 as shown in FIG. 9 illustrating a fifth embodiment, at rectilinear heat-seal portions 16 extending from the heat-sealed line 5 toward the one end side of the first sheet as shown in FIG. 10 illustrating a sixth embodiment, or at spot-like heat-seal portions 17 somewhat distant from the heat-sealed line 5 toward the one end side of the first sheet 1 as shown in FIG. 11 illustrating a seventh embodiment. The third through seventh embodiments may achieve an equivalent effect to that of the first embodiment.

Although the respective heat-seal portions are formed of broken lines according to the figures of the above embodiments, they may be formed of continuous lines instead. This is applicable to all the heat-seal portions other than the spot-like heat-seal portions 14 and 17.

According to the aforementioned embodiments, the extended laminate portion 9 of the first and third sheets 1 and 4 has filing holes 8 perforated outside of the heat-sealed line 5 of the disc storage bag (or at the upper end side of the storage bag as seen in the figure). The disc storage bag may be used in a way that the extended laminate portion 9 comes on a lateral side thereof, that is, in the vertical direction of the bag.

Further, in each of the above embodiments, a plurality of disc storage bags may be bound in a binder.

A plurality of disc storage bags in each of the above embodiments may be integrally formed in juxtaposition.

Figure 12:
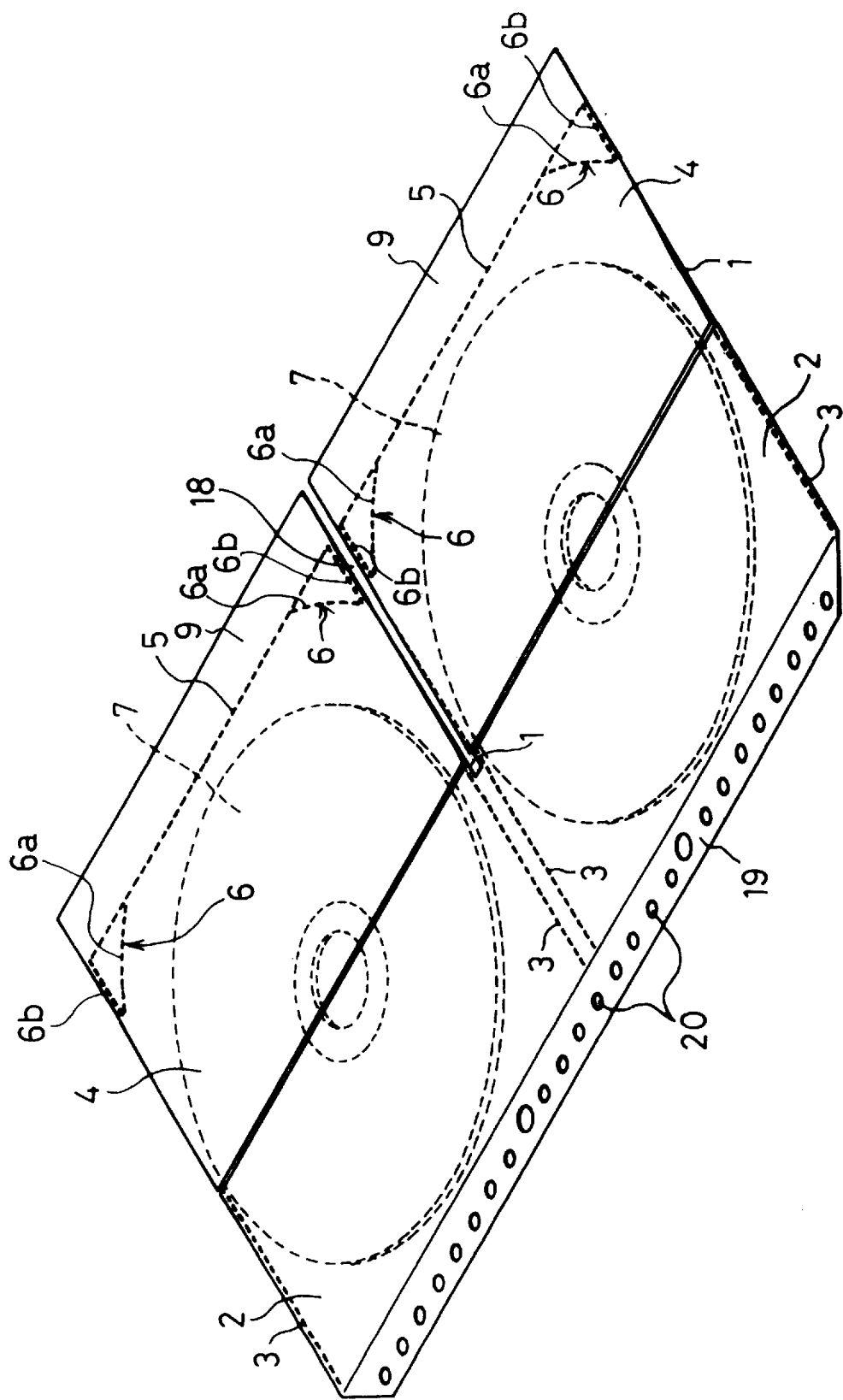
FIG. 12 is a perspective view illustrating a front surface side of a disc storage bag according to an eighth embodiment of the invention.
Figure 13:
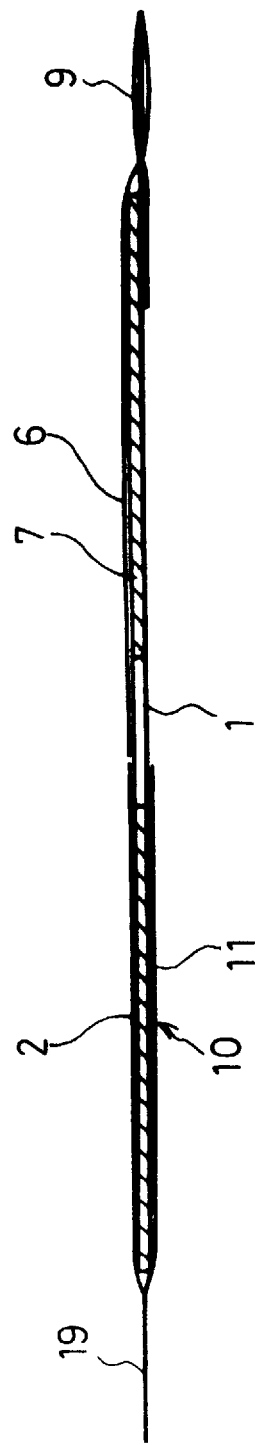
FIG. 13 is a sectional view of the disc storage bag.
Figure 14:
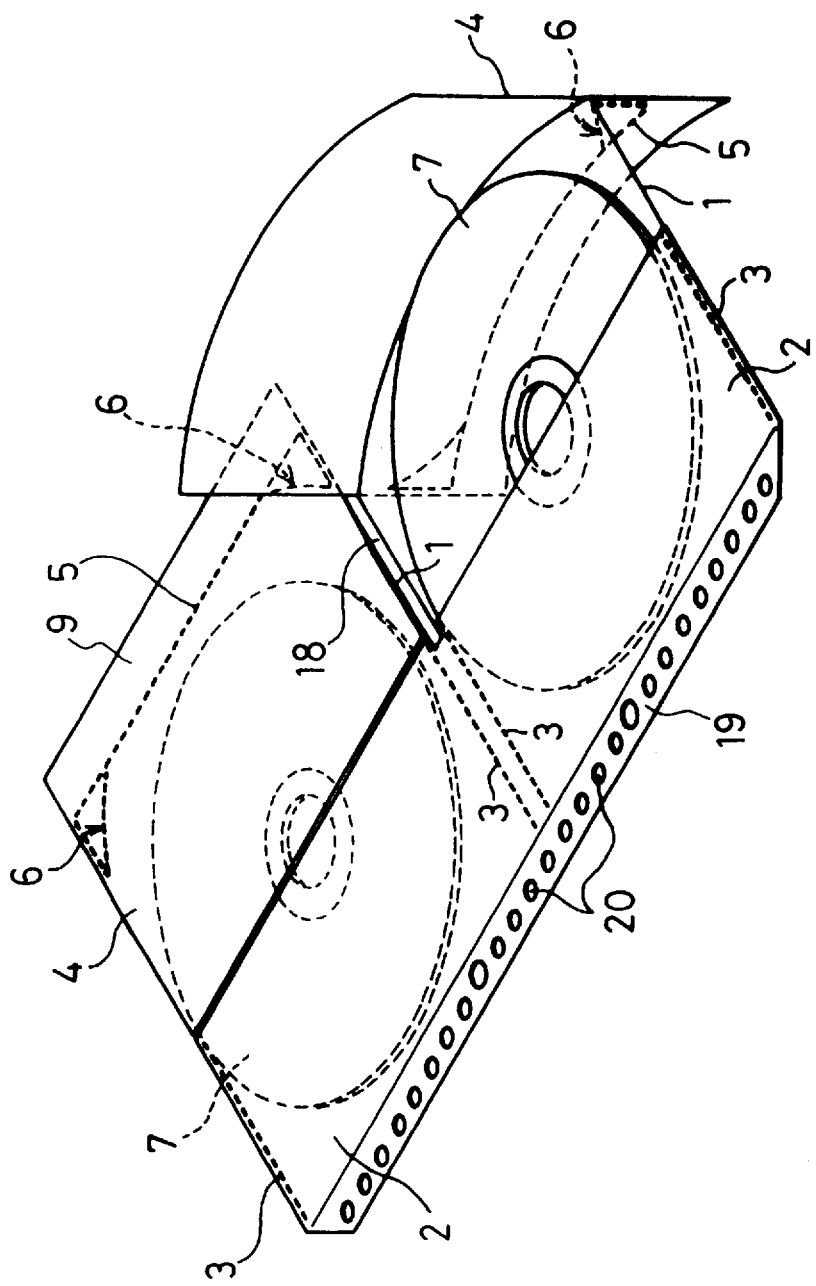
FIG. 14 is a perspective view illustrating a state wherein a disc is being inserted in the disc storage bag.

FIGS. 12 through 14 illustrate an eighth embodiment wherein two disc storage bags of the second embodiment are formed in one body. The two disc storage portions are arranged such that the respective first sheets 1 are separated from each other for the half length toward the other end side at such portions as other than the heat-sealed portions 3, thereby facilitating the insertion/removal of a disc in/from each of the two disc storage portions. The third sheets 4 are also separated from each other in association with the separation of the first sheets. Indicated by 18 is a portion where the first and third sheets are separated from each other between adjacent disc storage portions.

According to the eighth embodiment, unlike the first embodiment, no filing holes are perforated in the extended laminate portion 9 which is outside the heat-sealed line 5 and at which the third sheet 4 is bonded to the first sheet 1. Instead, the first sheet 1, the second sheet 2 and the sheet 11 are extended outward from the one end side of the first sheet and bonded to each other for forming an extended laminate portion 19 in which filing holes 20 are perforated. In the eighth embodiment, the paper holding portion 10 for holding a songs card or the like is formed on the other surface of the first sheet 1 by bonding the sheet 11 to the first sheet 1 at the one end side and to part of the lateral sides thereof. The sheet portion 11 is substantially of a half size of the first sheet 1.

The other part of the disc storage bag of this embodiment has substantially a similar structure to that of the second embodiment.

The disk storage bag according to the eighth embodiment is so arranged that the respective disc storage portions have first sheets 1 separated from each other at portions other than the heat-sealed portions 3 and, accompanying to this, the third sheets 4 are also separated from each other. This arrangement allows a disc to be inserted in or removed from one of the disc storage portions of the disc storage bag, with the third sheet 4 of the other disc storage portion being kept closed. This assures that each disc storage portion is opened/closed independently from each other.

In the eighth embodiment, not only the third sheets 4 but also the first sheets 1 formed of a nonwoven fabric are separated from each other so as to allow each of the disc storage portions to be independently opened/closed for insertion/removal of a disc. However, the first sheets 1 formed of a nonwoven fabric may not necessarily be separated from each other.

In the above eighth embodiment, the extended laminate portion 19 of the first sheet 1, the second sheet 2 and the sheet 11 is formed along the one end side of the disc storage bag (at the lower end side of the disc storage bag as seen in the figure). However, the disc storage bag may be positioned such that the extended laminate portion 19 comes at the upper end thereof. Alternatively, the disc storage bag may be positioned such that the extended laminate portion 19 comes along a lateral side thereof, that is, in the vertical direction as viewed by a user.

Further, a plurality of the disc storage bags may be bound in a binder.

Still further, the foregoing heat-seal bonding in each of the embodiments may be executed by applying heat to the to-be-bonded portions of the sheets with some heat sealing means. Such heat sealing means may be an ultrasonic sealing device.

What is claimed is:

1. A disc storage bag comprising:

a first sheet made of a nonwoven fabric;

a second sheet disposed on one surface of the first sheet for covering part of the first sheet toward one end of the first sheet; and a third sheet disposed on the same surface of the first sheet for covering substantially all of the surface toward an other end of the first sheet which is not covered by the second sheet;

said first sheet forming a covered disc storage portion jointly with the second and third sheets;

said first and second sheets being bonded adjacent said one end and adjacent opposite lateral sides so as to form a bag portion therebetween;

said third sheet being bonded to the first sheet adjacent said other end and also at a pair of laterally spaced portions adjacent said opposite lateral sides and near said other end of the first sheet, but spaced a substantial distance from said other end toward said one end of the first sheet so as to form a shallow pocket between the first and third sheets adjacent said other end of the first sheet;

said third sheet having a free portion not bonded to the first sheet, which extends from said pair of laterally spaced portions toward said one end of the first sheet to completely cover said disc storage portion;

wherein the pair of laterally spaced portions are so located that a virtual line extending therebetween traverses a continuous portion of the third sheet that overlays a portion of a disc when stored in the disc storage portion of said bag near a point of the disc periphery closest to said other end of the first sheet but spaced from said point a small distance toward said one end of the first sheet.

2. A disc storage bag as set forth in claim 1, and including a plurality of juxtaposed disc storage portions wherein the third sheets of adjacent disc storage portions are separated from each other so that they can be opened and closed independently from each other.

3. A disc storage bag as set forth in claim 1, wherein the second sheet is made of a nonwoven fabric.

4. A disc storage bag as set forth in claim 1, wherein the third sheet is made of a nonwoven fabric.

5. A disc storage bag as set forth in claim 1, wherein the second sheet is made of a synthetic resin film.

6. A disc storage bag as set forth in claim 1, wherein the third sheet is made of a synthetic resin film.

7. A disc storage bag as set forth in claim 1, wherein the pair of laterally spaced portions at which the third sheet is bonded to the first sheet are each in the form of an oblique line angled outwardly at about 45° with respect to the connected portion of the first and third sheets adjacent said other end.

8. A disc storage bag as set forth in claim 1, wherein the pair of laterally spaced portions at which the third sheet is bonded to the first sheet are each in the form of a straight line extending parallel to the lateral sides toward said one end of the first sheet from the bonded portion of the first and third sheets adjacent said other end.

9. A disc storage bag as set forth in claim 1, wherein the pair of laterally spaced portions at which the third sheet is bonded to the first sheet are each in the form of a spot spaced toward said one end from the bonded portion of the first and third sheets adjacent said other end.

10. A disc storage bag as set forth in claim 1, wherein the pair of laterally spaced portions at which the third sheet is bonded to the first sheet are each in the form of an oblique line positioned slightly inward from the respective lateral side and angled outwardly at about 45° with respect to the bonded portion of the first and third sheets adjacent said other end.

11. A disc storage bag as set forth in claim 1, wherein the pair of laterally spaced portions at which the third sheet is bonded to the first sheet are each in the form of a straight line positioned slightly inward from the respective lateral side and extending toward said one end of the first sheet from the bonded portion of the first and third sheets adjacent said other end.

12. A disc storage bag as set forth in claim 1, wherein the pair of laterally spaced portions at which the third sheet is bonded to the first sheet are each in the form of a spot positioned slightly inward from the respective lateral side and spaced toward Said one end of the first sheet from the bonded portion of the first and third sheets adjacent said other end.

13. A disc storage bag as set forth in claim 1, wherein a fourth sheet made from one of a nonwoven fabric and a synthetic resin film is disposed on a rear surface of said first sheet and bonded to the first sheet at one end and at opposite lateral sides of the first sheet, thereby providing a paper holding portion therebetween.

* * * * *